United States Patent [19]

Slavin et al.

[11] 3,763,625
[45] Oct. 9, 1973

[54] INSTALLATION FOR AUTOMATIC PLACEMENT OF EGGS INTO CELLULAR TRAYS

[76] Inventors: Rady Mikhailovich Slavin, Zelenodolskaya ulitsa, 15, korpus 1, kv. 45, Moscow; Vilyam Lvovich Levin, 4 Michurinsky tupik, 4, stantisia Skhodnya Oktyabrskoi zheleznoi dorogi; Sergei Andreevich Kishechnikov, Yasnopolyanskaya ulitsa, 9/4, kv. 36, Moscow, all of U.S.S.R.

[22] Filed: May 16, 1972

[21] Appl. No.: 253,733

[52] U.S. Cl. .......................... 53/62, 53/55, 53/160, 53/251, 214/6 BA
[51] Int. Cl. ............................................. B65d 57/10
[58] Field of Search ................ 53/62, 55, 160, 251; 214/6 BA

[56] References Cited
UNITED STATES PATENTS
3,342,012   9/1967   Reading ............................... 53/62
3,592,001   7/1971   Gross ................................. 53/62 X Primary Examiner—Travis S. McGehee
Attorney—Eric H. Waters et al.

[57] ABSTRACT

In the installation for automatic placement of eggs into cellular trays the eggs are from an egg director fed into cells of an egg accumulating conveyer with subsequent displacement of a certain number of eggs into the cells of the tray. The latter is supplied by a conveyer from an accumulator of empty trays which is mounted at one end of this conveyer and is provided with a mechanism for single-piece separation of empty trays from the stack. Disposed at the other end of the tray carrying conveyer is a device for stacking the egg-filled trays, comprising a means to accumulate the filled trays into a stack and a mechanism for a single-piece feed of these trays to said means with a simultaneous turn of each tray in the horizontal plane through 90° relative to the preceding tray. The mechanism for a single-piece feed of filled trays is drivingly connected with the mechanism for single-piece separation of empty trays from the stack, with the egg accumulating conveyer, and with the tray supply conveyer, for their coordinated movement with the egg accumulating conveyer.

10 Claims, 7 Drawing Figures

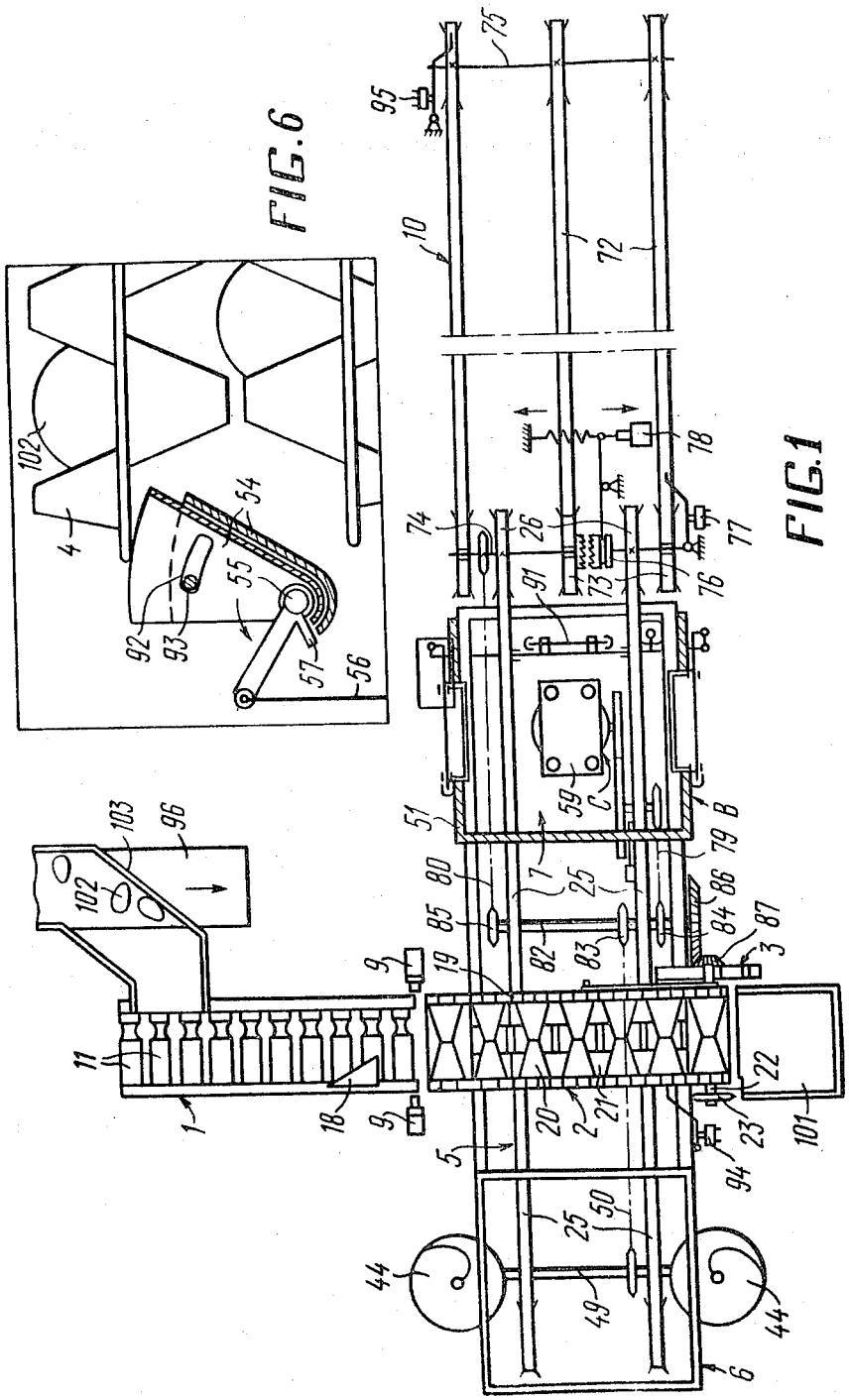

PATENTED OCT 9 1973 3,763,625

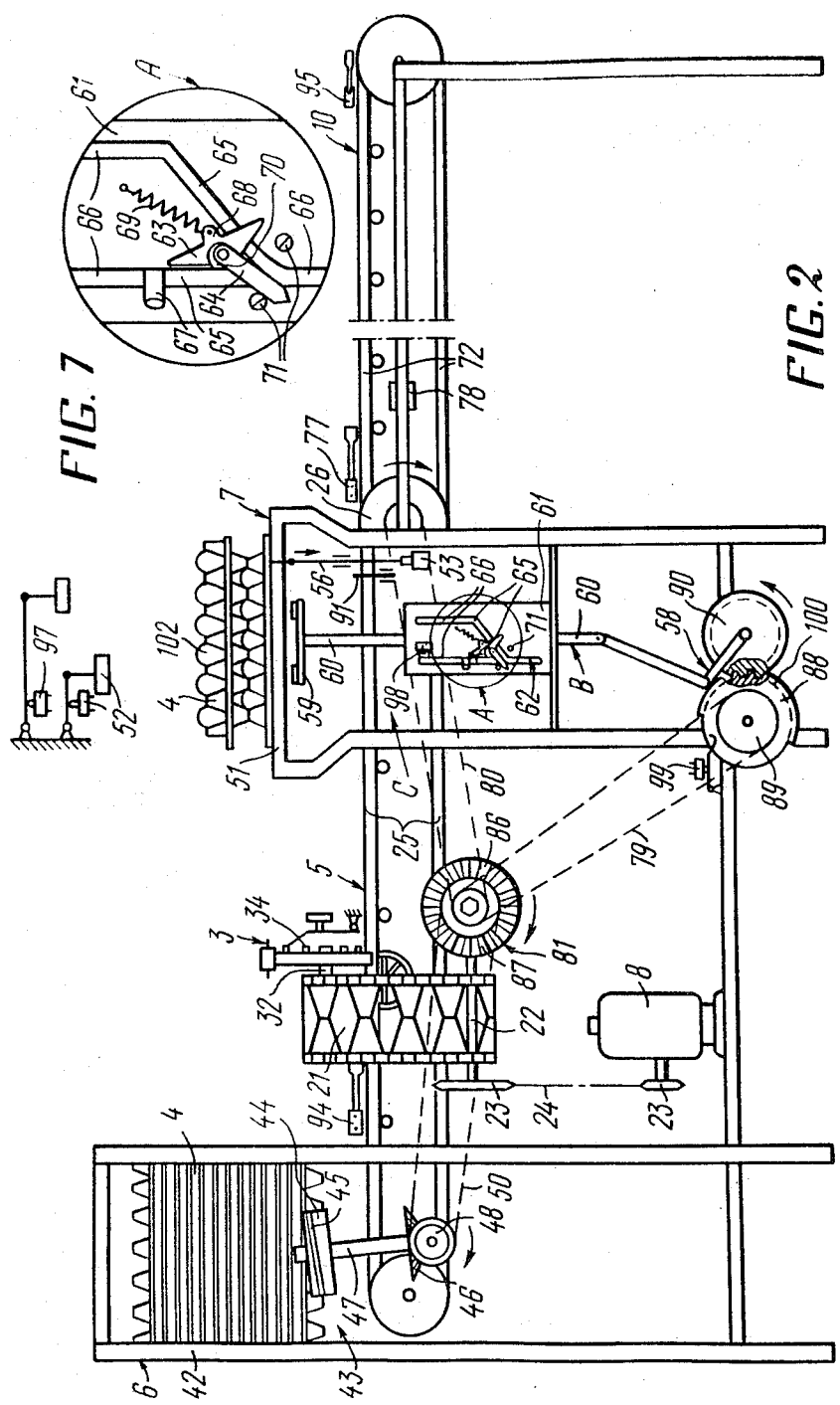

INSTALLATION FOR AUTOMATIC PLACEMENT OF EGGS INTO CELLULAR TRAYS

The present invention relates to installations for automatic placement of eggs into cellular trays, which installations can be used for crating both graded and ungraded eggs, i.e., they can be used in poultry house conditions.

All the main work processes in poultry houses are today mechanized. The only labour-consuming operation left is the crating of eggs to deliver them to the processing center. This takes 70 percent of the work time of the servicing personnel in poultry houses.

Known in the art are installations for automatic placement of eggs intended mainly for graded eggs. Thus, an installation developed by Ben Newis Co. comprises an accumulating pin conveyer, a plate egg director, a mechanism to place the eggs into tray cells, and a conveyer for moving the cellular trays.

The main units of this installation have separate drives, and therefor have to be synchronized for its normal operation.

Besides that, such installations cannot be employed in poultry houses, since the accumulator conveyer does not separate very big (double-yolk) eggs from the flow of eggs to be crated, these big eggs being damaged when stacking the trays. These installations have neither an accumulator of filled trays, nor an accumulator of stacked empty trays with a mechanism for single-piece separation of the trays from the stack, and therefore cannot operate for a long time in an automatic cycle without a man's presence.

Also known is an installation for automatic placement of eggs, wherein the eggs are fed by an egg director into cells of an accumulator conveyer with subsequent displacement of a certain number of eggs into the cells of a ray delivered by another conveyer from an accumulator of stacked empty trays which is mounted at one end of this conveyer and is fitted with a mechanism for single-piece separation of trays from the stack, a sensing element being interposed between the egg director and the accumulating conveyer to produce a signal, on passage of an egg from the egg director, for energizing the electric drive connected with the driving shaft of the accumulating conveyer, to move the latter (see, for example, a USSR Author's Certificate No. 158,226, cl.81a, $15_{01}$).

This is again a multi-drive installation, its units having to be synchronized in operation. Besides, the empty trays accumulator is adapted only to flat-bottom trays which are pre-separated in the accumulator one by one. These trays take 3-4 times more space, than the cellular trays. The accumulator of flat-bottom trays is therefore cumbersome, and significantly increases the overall dimensions of the installation.

It is an object of the present invention to provide an installation for automatic placement of eggs into cellular trays, that could work a long time without human presence in poultry house conditions, i.e., execute automatic placement of ungraded eggs.

Another object of the present invention is to create an installation for automatic placement of eggs into cellular trays, wherein the operation of all its mechanisms would be strictly coordinated through their driving connections.

These and other objects are achieved by the proposed installation for automatic placement of eggs into cellular trays, wherein the eggs are fed by an egg director into cells of an accumulating conveyer with subsequent displacement of a certain number of eggs into the cells of a tray delivered by another conveyer from an accumulator of stacked empty trays which is mounted at one end of this conveyer and is fitted with a mechanism for single-piece separation of trays from the stack, a sensing element being interposed between the egg director and the accumulating conveyer to produce a signal, on passage of an egg from the egg director, for energizing the electric drive connected with the driving shaft of the accumulating conveyer, to move the latter. According to the invention, this installation is provided with a device for stacking trays filled with eggs, which device is disposed at the other end of the tray delivering conveyer, and comprises a means to accumulate the egg-filled trays into a stack and a mechanism for a single-piece feed of these trays to said means with a simultaneous turn of the tray in the horizontal plane through 90° relative to the preceding tray, the latter mechanism being drivingly connected with the mechanism for single-piece separation of empty trays from their stack, with the egg accumulating conveyer, and with the tray delivering conveyer, for their coordinated movement with the egg accumulating conveyer.

Provision of the device to stack egg-filled trays enables long-time operation of the installation without human participation, while the driving connection of the mechanism for a single-piece feed of egg-filled trays with the mechanism for single-piece separation of empty trays from their stack, with the tray delivering conveyer, and with the egg accumulating conveyer permitted obviating the multi-drive system in the installation and securely coordinating the movement of its mechanisms.

The means to accumulate a stack of egg-filled trays should advantageously comprise a horizontal frame, a sensor mounted over the frame at a distance equaling the stack height, an electric magnet which is electrically connected with the sensor, and throw-over catches mounted on axles which are hingedly secured in one horizontal plane on the opposite sides of the frame, are rigidly connected through a linkage with the core of the electric magnet, and are fitted with detents to interact with the catches for their positive swinging as the accumulated stack engages the sensor producing a signal to energize the electric magnet.

The mechanism for a single-piece feed of the egg-filled trays to the means to accumulate a stack with a simultaneous turn of the tray in the horizontal plane through 90° relative to the preceding tray should advisably comprise a crank gear, a lifting platform rigidly mounted on a push rod of the crank gear, and a cylinder through which passes the push rod, and in the side wall of which there is made a channel of an approximately V-shaped configuration and a swivel rocker connected with a swivel valve are hingedly secured thereto, the free ends of the branches of this channel and the place of their joint passing into vertical channel sections, while the valve is hinged between the channel branches and alternately shuts them after the rocker is swiveled by a pin secured on said push rod and sliding along one of the channel branches as the platform lifts.

Such a design of the mechanism for a single-piece feed of the filled trays to the means to accumulate a stack made it possible to realize automatic turning through 90° of each subsequent tray relative to the preceding one in the course of stacking the filled trays.

It is expedient realizing the driving connection of the mechanism for a single-piece feed of egg-filled trays and their simultaneous turn through 90° with the tray delivering conveyer, the egg accumulating conveyer, and the mechanism for single-piece separation of empty trays from the stack by means of chain transmissions, a bevel gear pair, and a distribution shaft carrying sprockets to engage said chain transmissions one of said bevel gears being rigidly mounted on the drive schaft of the egg accumulating conveyer, and the other one being secured on the distribution shaft and through said chain transmissions connected with the drive shaft of the tray delivering conveyer and with the mechanism for single-piece separation of empty trays from the stack.

Such a connection provides for a more uniform distribution of the load on all the units of the installation, and enables interconnecting them using a minimum number of transmissions.

The mechanism for single-piece separation of empty trays from the stack is desirable to comprise two rotary cylinders mounted on either side of the stack, a screw threading being formed on the side surface of each of said cylinders to enable them catching the edge of the lowermost tray and moving it down, and rotation of the cylinders being realized through bevel gearings whose driven gears are rigidly connected to the cylinders, while their pinions are rigidly secured on a shaft rotated by one of the chain transmissions connecting the distribution shaft with the mechanism for single-piece separation of empty trays from the stack.

With the cylinders rotating onward each other, the threading on one of the cylnders should advisably be made right-handed, and on the other cylinder, left-handed.

Such a design of the mechanism for single-piece separation of empty trays from the stack combined with a positive driving interconnection of the main mechanisms of the installation enables reliable separation of the trays from the stack with a specified sycle time and a simplest kinematic system.

The conveyer to deliver the trays should advantageously be made of parallel vee belts, which permits delivering the trays to the mechanism for a single-piece feed of filled trays and to the means for accumulating the filled trays into a stack, at time intervals required for their stacking.

It is desirable that the cells of the egg accumulating conveyer have a shape and a size coinciding with those of the tray cells, thus enabling automatic separation of very big eggs from the flow of eggs prior to their placement into trays, and separate accumulation of such eggs. For this purpose a trough should be placed in one line with the egg director and the egg accumulating conveyer.

Advisably, mounted after the device to stack egg-filled trays and in line with the tray delivering conveyer should be a conveyer for accumulating stacks of filled trays, the drive shaft thereof being connected with the drive shaft of the tray delivering conveyer.

Thus, due to the proposed design of the mechanisms and their interconnection, the installation for automatic placement of eggs into cellular trays can work a long time without any human presence, and can separate very big eggs from the flow of eggs prior to their placement.

The invention is further explicated by a description of a particular exemplary embodiment of the installation for automatic placement of eggs with references to the appended drawings, wherein:

FIG. 1 is a schematic diagram of the installation according to the invention, plan view;

FIG. 2 — same, side view;

Figure 5:
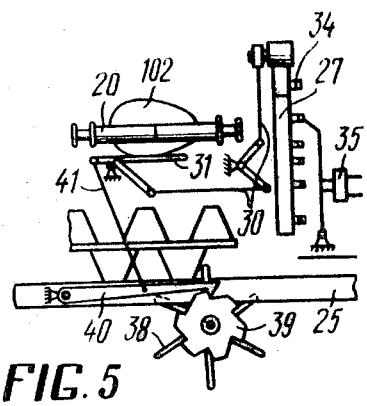

FIG. 5 — same, side view;

FIG. 6 shows the throw-over catches of the means to accumulate filled trays into a stack;

FIG. 7 shows the place designated at A in FIG. 2.

The installation for automatic placement of eggs into cellular trays comprises an egg director 1 (FIG. 1); an egg accumulating conveyer 2; a mechanism 3 for placing a row of eggs into a cellular tray 4 (FIG. 2); a conveyer 5 for moving trays 4; an accumulator 6 of empty trays 4 which is disposed at one end of conveyer 5; a device 7 for stacking the egg-filled trays 4 which is located at the other end of conveyer 5; an electric drive 8; a sensor 9 (FIG. 1) interposed between the egg director 1 and the egg accumulating conveyer 2; a conveyer 10 for accumulating the stacks of egg-filled trays.

Figure 3:
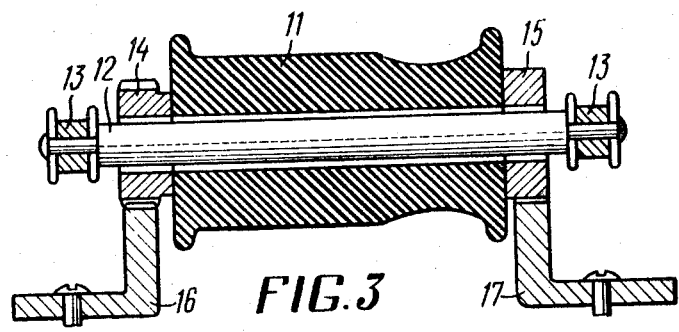
FIG. 3 shows one of the rollers of the egg director of the installation, longitudinal section.

The egg director 1 is intended for orienting the arriving eggs so that their smaller ends be directed to one side, and is disposed in one line with the egg accumulating conveyer 2. It consists of rubber-coated rollers 11 each of which freely wheels on an axle 12 (FIG. 3) whose ends are attached to chains 13.

Secured on one end face of each roller 11 is a gear 14, and on the other end face, a square plate 15. Gear 14 engages a toothed rack 16, while plate 15 slides against a plate 17.

Mounted at the end of the egg director 1 (FIG. 1) is a guide plate 18 serving to turn the eggs so as to direct their smaller ends to one side.

The toothed rack 16 (not shown in the drawing) extends along the egg director till the place of disposition of the guide plate 18, whereas plate 17 is located within the area of disposition of the guide plate 18.

The accumulating conveyer 2 consists of two chains 19 connected to each other by guides 20. Guides 20 have a concave shape on their sides, so as to form cells 21 whose size and shape coincide with those of the cells in tray 4. This is necessary in order that big eggs should remain suspended on guides 20 and not sink into cells 21 of the egg accumulating conveyer 2. Chains 19 roll over sprockets (not shown in the drawing) rigidly fixed on the drive shaft 22 and on driven shafts (not shown). The drive shaft 22 through sprockets 23 and a chain 24 (FIG. 2) is connected with the electric drive 8 to be rotated thereby.

A signal to switch in the electric drive 8 is produced by sensor 9 (FIG. 1) after an egg leaves director 1. The time intervals between the movements of the accumulating conveyer 2 depend on the frequency of arrival of eggs from director 1, i.e., as an egg drops from the director into cell 21 the accumulating conveyer 2 is given a pitch displacement equaling the distance between two adjacent cells 21.

Conveyer 5 to deliver the trays consists of two endless parallel vee belts 25 stretched on pulleys, two of which, 26, are the drive pulleys.

Mechanism 3 to place a row of eggs into the tray comprises a disk 27 (FIG. 4), an arm 28 with a roller 29, a linkage 30, and a swivel plate 31 disposed under cells 21 (not shown in this drawing) of the accumulating conveyer 2.

Disk 27 is rigidly fixed on a driven shaft 32 (FIG. 2) of the accumulating conveyer 2, and makes one complete revolution when one row of eggs is accumulated on conveyer 2, the size of the row depending on the number of cells in one row of the tray, and all the installation being designed for operation with cellular trays comprising 30 cells, i.e., six rows, each having five cells.

Provided on the periphery of disk 27 (FIG. 4) is a cutout 33 to accommodate roller 29 of arm 28, and secured on one of its faces are five lugs 34 (FIG. 5) each of which in succession, as disk 27 proceeds turning, interacts with a sensor 35 to deenergize the electric drive 8 (FIG. 2) after the accumulating conveyer 2 moves one pitch forward.

The swivel plate 31 (FIG. 4) whereon resting are the eggs being accumulated in conveyer 2, is through a linkage 30 connected with arm 28, so that when roller 29 sinks into cutout 33 of disk 27 it swivels to drop the row of eggs into the cells of tray 4, the shape and dimensions of cutout 33 being chosen so as to return plate 31 to its initial position before the next egg for the subsequent row drops onto it. For a more accurate direction of eggs into the cells of tray 4 the swivel plate 31 is fitted with guide grooves 36 along which the eggs slip into the tray.

To stop the tray exactly under mechanism 3, provided in the installation is a tray arresting gear acting at the time of placement of the row of eggs into the tray cells, which gear consists of a ratchet and a "squirrel cage."

The "squirrel cage" is disposed across conveyer 5 under its upper side, and comprises a shaft 37 whereon radially mounted and equally spaced apart are six blades (webs) 38. Blades 38 block the movement of tray 4 from underneath by entering the space between the rows of the tray cells.

The ratchet wheel 39 of the ratchet mechanism is rigidly fixed on shaft 37 of the "squirrel cage," while its pawl 40 (FIG. 5) is hinged on the frame of the installation and is through a link 41 connected with the swivel plate 31, so that as the latter swivels pawl 40 turns and disengages the ratchet wheel 39.

Accumulator 6 of stacked empty trays (FIG. 2) comprises a frame 42 and a mechanism 43 for single-piece separation of the empty trays from the stack.

Frame 42 has vertical uprights made in the form of guides wherealong moves the tray stack.

The mechanism 43 for single-piece separation of the trays from the stack is made of two cylinders 44 mounted on either side of the stack and rotating onward each other. Formed on the side surface of each cylinder 44 is a screw threading 45, this threading 45 on one of cylinders 44 being right-handed, and on the other one, left-handed, during the rotation of cylinders 44 the screw threadings 45 catching the edge of the lowermost tray and moving it down.

Each cylinder 44 is rotated by a bevel gearing, the driven gears 46 of these gearings being rigidly secured on axles 47 of cylinders 44, while their pinions 48 are fixed on a shaft 49 (FIG. 1) driven by a chain transmission 50.

Device 7 for stacking egg-filled trays consists of a means B to accumulate the filled trays into a stack, and a mechanism C for a single-piece feed of the filled trays to said means B with a simultaneous turn of the tray in the horizontal plane to 90° relative to the preceding tray.

The means B to accumulate filled trays into a stack comprises a horizontal frame 51 (FIG. 2), a sensor 52 mounted over frame 51 at a distance equaling the stack height, an electric magnet 53 which is electrically connected with sensor 52, and throw-over catches 54 (FIG. 6). The throw-over catches 54 are arranged in pairs on axles 55 which are hingedly secured in one horizontal plane on the opposite sides of frame 51 (as is shown in FIG. 1) and are through a linkage 56 rigidly connected with the core of the electric magnet 53 (FIG. 2), one of catches 54 in each pair that is located nearer to the tray being made with a somewhat smaller height than the other one, for reliable tray fixing in the upper position.

Axles 55 (FIG. 6) are provided with detents 57 to interact with catches 54 for their positive swinging when the accumulated stack engages sensor 52 (FIG. 2) which produces a signal to energize the electric magnet 53. After catches 54 are swung upward the accumulated tray stack freely sinks along frame 51 (FIG. 2) onto conveyer 5.

The mechanism C for a single-piece feed of filled trays to the accumulating means B with a simultaneous turn of the tray in the horizontal plane through 90° comprises a crank gear 58, a lifting platform 59 which is rigidly mounted on a push rod 60 of the crank gear 58, and a cylinder 61 wherethrough passes the push rod 60. Formed in the side wall of cylinder 61 is a channel 62 of an approximately V-shaped configuration, and hingedly secured on said wall are a swivel rocker 63 (FIG. 7) and a swivel valve 64 which are in a connection with each other.

The free ends of branches 65 of channel 62 and the junction of these branches 65 pass into vertical channel sections 66.

Valve 64 is hingedly secured between branches 65 of channel 62 and alternately blocks them after rocker 63 is swiveled by a pin 67 secured on the push rod 60 (FIG. 2) and sliding along one of the branches of channel 62 as platform 59 moves upward.

Rocker 63 (FIG. 7) has a lug 68 connected to a compression spring 69, the other end of spring 69 being attached to the wall of cylinder 61. Besides that, rocker 63 has in the place of attachment of valve 64 a slot 70 owing to which valve 64 is capable of limited swinging with respect to rocker 63.

To allow limited swinging of rocker 63 and valve 64, placed on the surface of cylinder 61 right near the vertical section 66 of channel 62 adjacent the junction of branches 65 are stops 71.

Mounted in one line with conveyer 5 (FIG. 1) after the tray stacking device 7 is a conveyer 10 for accumulating the stacks of egg-filled trays, this conveyer being made of vee belts 72 stretched on pulleys, part of which, 73, are bearing-mounted on a drive shaft 74 of conveyer, 5, and the rest are secured on a driven shaft 75, the drive shaft of the accumulating conveyer 10 being made integral with the drive shaft 74 of conveyer 5, and the bearing-mounted pulleys 73 coming into connection with shaft 74 by means of a clutch 76.

The stack accumulating conveyer 10 is provided with a sensor 77 and an electric magnet 78 which is electrically connected with sensor 77 and is intended to actuate clutch 76. After the engagement of clutch 76 pulleys 73 of conveyer 10 start rotating together with the drive shaft 74 of conveyer 5, conveyer 10 thus removing from conveyer 5 the stack of filled trays.

Mechanism C for a single-piece feed of filled trays to the tray stacking means B is drivingly connected with mechanism 43 (FIG. 2) for single-piece separation of empty trays from their stack, with conveyer 5, and with the egg accumulating conveyer 2, for their coordinated movement with the accumulating conveyer 2.

This driving connection is realized through chain transmissions 50, 79, 80, a bevel gear pair 81, and a distribution shaft 82 (FIG. 1) whereon fixed are sprockets 83, 84, and 85, sprocket 83 being engaged by the chain transmission 50, sprocket 84 by transmission 79, and sprocket 85 by transmission 80.

The chain transmission 50 imparts motion to mechanism 43 for single-piece separation of trays from the stack in the empty trays accumulator 6, transmission 79 drives the crank gear 58 (FIG. 2) of mechanism C for a single-piece feed of filled trays, and transmission 80 rotates the drive shaft 74 of conveyer 5. Gear 86 of the bevel gearing 81 is rigidly secured on the distribution shaft 82, and pinion 87 of gearing 81 is fixed on the drive shaft 22 of the egg accumulating conveyer 2.

For the chain transmission 79 to drive the crank gear 58 (FIG. 2) the latter is furnished with a gearing, one of whose wheels, 88, is rotated by the chain transmission 79 through a sprocket 89. The diameter of wheel 88 is more than that of wheel 90, and it has teeth disposed but within a part of its circumference approximately equaling half the length of this circumference, while the number of teeth on wheel 88 equals the number of teeth on wheel 90. Such a design of this gearing is necessary in order to ensure delivery of the egg-filled tray to the stacking device 7 while platform 59 is at rest in its lowermost position.

To locate the filled tray carried by conveyer 5 exactly over the lifting platform 59, placed under conveyer 5 is an arrester 91 which is hingedly connected to linkage 56 associated with the electric magnet 53.

To limit the swinging movement of the throw-over catches 54 (FIG. 6), made in the latter is a slot 92 accommodating a stop 93 which is fixed on the frame of the installation.

Besides that, the installation for automatic placement of eggs incorporates control sensors to provide for automatic operation of all its mechanisms; thus, a sensor 94 (FIG. 2) checks the presence of a tray under the egg accumulating conveyer 2; a sensor 95 produces a signal to deenergize the drives of the egg collection conveyer 96 and the egg director 1 after the accumulating conveyer 10 is filled with stacks of egg-filled trays; a sensor 97 passes a signal to disconnect the drives of conveyer 96 and director 1 in case the tray stack in device 7 is overfilled; a sensor 98 passes a signal to switch in the electric magnet 53 and, accordingly, to swing catches 54, provided platform 59 with the stack of filled trays sinks without turning, since a turn of platform 59 with the stack of filled trays is bound to cause jamming of the stack in frame 51. A sensor 99 produces a signal to energize the electric magnet 53 after the stack of filled trays leaves mechanism C and passes to conveyer 10. Sensor 99 is switched in by stops 100 mounted on the face of gear 88.

Mounted in one line with the egg director 1 (FIG. 1) and the egg accumulating conveyer 2 in front of the latter is a trough 101 for collecting the eggs not accommodated by cells 21 of conveyer 2.

The proposed installation for automatic placement of eggs operates as follows.

After accumulator 6 (FIG. 2) is filled with a stack of empty trays 4, which are cellular cartons made of pressed cardboard or plastic and comprise 30 cells, i.e., six rows, each having five cells, the "start" button is pushed at the control desk (not shown), the installation being thus set in motion.

As soon as the first carton from accumulator 6 is delivered by conveyer 5 to under the egg accumulating conveyer 2, the push-button is let free, the installation being now ready for automatic operation.

The drives of the belt conveyer 96 (FIG. 1) and the egg director 1 are turned on, eggs 102 being guided by a guard 103 onto the egg director 1. The revolving rollers 11 carry eggs 102 along the director, all the eggs being here oriented with their smaller ends pointing to the right or to the left (as in the direction of movement of the working side of the director). The guide plate 18 turns over the eggs located rightwards, so that before entering the accumulating conveyer 2 all the eggs are oriented with their smaller ends pointing in one direction.

As an egg passes from director 1 into cell 21 of the accumulating conveyer 2, sensor 9 works to produce a signal for energizing the electric motor 8 (FIG. 2). The latter starts rotating, through the chain transmission 24 and shaft 22 imparting motion to the egg accumulating conveyer 2, and through the bevel gearing 81 and chain transmissions 50, 79, and 80 to driving conveyer 5 that delivers trays 4, mechanism 43 for single-piece separation of empty trays from the stack, and mechanism C to feed the filled trays to their accumulation means B. After the latter are moved over one pitch (step) sensor 35 passes a command to turn off drive 8.

When the next oriented egg is fed the contacts of sensor 9 again close, the electric motor 8 is switched on, and all the mechanisms are moved one step further.

With such stepped movement, cylinders 44 in mechanism 43 for single-piece separation of empty trays from the stack rotate intermittently, the slits of their threading 45 catching from two opposite sides the lowermost carton in the stack, and moving it down. After the tray falls onto conveyer 5 the slits of threading 45 catch the edges of the next carton. For the time thirty eggs are fed from the egg director cylinders 44 make one revolution.

At this time the crank gear 58 raises platform 59 which lifts the egg-filled carton from conveyer 5 and brings it to the accumulating means B. As it does so, pin 67 (FIG. 7) of the push rod 60 slides along the vertical section 66 of channel 62 and passes into one of its branches 65 turning platform 59 with the carton through 90° or not turning it at all, each subsequent tray being turned through 90° relative to the preceding one, which is vital for correct stacking of the egg-filled trays. The direction of turn of platform 59 depends on the position of valve 64. Pin 67 following the rising platform 59 turns rocker 63, and valve 64 swivels together therewith, pin 67 having slid along the free branch of channel 65 since the other branch was at that time shut by valve 64.

During the rise of platform 59 (FIG. 1) the carton swings catches 54 (FIG. 6) and freely passes upwards. Then platform 59 sinks leaving the tray on catches 54 which have by their own gravity returned to their initial position.

During the downward stroke of the lifting platform 59 pin 67 freely passes past valve 64 slightly pressing it aside, but not switching it over, and during the next rise of the platform pin 67 sliding along the other branch of channel 62 swivels rocker 63 and together therewith the valve 64, thus blocking the channel wherealong it slides and opening the other channel.

Figure 4:
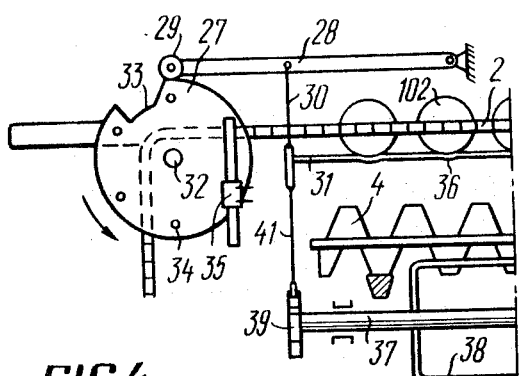
FIG. 4 shows part of the mechanism for placing eggs into cellular trays, front view.

Concurrently with the stepped movement of the accumulating conveyer 2 rotating intermittently is disk 27 (FIG. 4). As soon as a row of eggs equaling the number of cells in one row of the tray is accumulated in cells 21 of conveyer 2, disk 27 comes to a position where roller 29 of arm 28 gets into its cutout 33. Arm 28 through linkage 30 swivels plate 31, so that all the eggs accumulated in cells 21 of conveyer 2 are tilted with their sharp ends downward and sink into the cells of the carton. Simultaneously link 41 (FIG. 5) connecting plate 31 and pawl 40 turns the latter to disengage it with the ratchet wheel 39. Since the carton is all the time in contact with the vee belts 25 of conveyer 5, the next step of movement of this conveyer due to the adhesion forces between the belts and the carton displaces the latter one step forward and thus through blade 38 turns the "squirrel cage" and the ratchet wheel 39.

After a row of eggs is placed into a row of cells of the tray, and roller 29 of arm 28 emerges from cutout 33 of disk 27 onto its peripheral surface, plate 31 swivels to its initial position and pawl 40 again engages the ratchet wheel 39 to stop rotation of the "squirrel cage," the next blade 38 thereof entering the space between the rows of the tray and arresting it.

Thus eggs fill the carton row by row. While a carton is being filled with 30 eggs, accumulator 6 supplies to conveyer 5 the next empty carton, and a filled carton is delivered to mechanism C for a single-piece feed of fillted trays and further to the accumulating means B.

In case there arrives a very big egg, it remains suspended in guides 20 (FIG. 1) of the accumulating conveyer 2 and does not get into its cell 21 and, hence, into the tray cell. During the further movement of conveyer 2 such an egg rolls into trough 101 mounted in one line therewith.

If the next tray has not arrived to under the accumulating conveyer 2 the contacts of the control sensor 94 disconnect, thus deenergizing the drive of the belt conveyer 96 and the egg director 1. The supply of eggs to the accumulating conveyer 2 is stopped, and a signal lamp is lit at the control desk.

After in device 7 for stacking egg-filled trays a stack of required height is formed, it will during the next rise of platform 59 lift just to engage sensor 52 (FIG. 2) which sends a signal to switch in the electric magnet 53, this magnet being energized only in the case when platform 59 rises without a turn, i.e., when sensor 98 is switched on. The core of the electric magnet 53 pulls in and through linkage 56 swings catches 54 and sinks arrester 91 (FIG. 7). As platform 59 goes down all the stack of trays freely passes through frame 51 (FIG. 1) of device 7 and is placed on conveyer 5. With the movement of the latter the stack of the filled trays passes to the accumulating conveyer 10. At this moment sensor 77 works, and the electric magnet 78 actuates clutch 76 which connects the drive shaft 74 of conveyer 5 with pulleys 73 of the accumulating conveyer 10. The latter is moved in synchronism with conveyer 5.

After the stack of filled trays passes beyond arrester 91 stop 100 turns off sensor 99 and the latter disconnects the electric magnet 53, catches 54 and arrester 91 thus returning to the initial position. After the stack of filled trays fully passes onto conveyer 10 sensor 77, electric magnet 78, and clutch 76 are disconnected, and conveyer 10 stops.

Thus, the proposed installation for automatic placement of eggs can work a long time in an automatic cycle without human presence.

What we claim is

1. An installation for automatic placement of eggs into cellular trays, comprising: an egg director to place the eggs so that their smaller ends be pointed towards one side; a conveyer to accumulate a row of eggs, which is mounted in one line with said egg director; cells of said accumulating conveyer for placing the eggs oriented by said egg director; a drive shaft of said egg accumulating conveyer; a mechanism to place a row of eggs from the cells of said accumulating conveyer into the cells of a tray located under said accumulating conveyer; a conveyer to deliver said trays to said mechanism for placing a row of eggs, which is disposed square to said accumulating conveyer; and accumulator of stacked empty trays which is mounted at one of the ends of said tray delivering conveyer; a mechanism for single-piece separation of empty trays from their stack incorporated in said accumulator of empty trays; an electric motor connected with said drive shaft of the accumulating conveyer, to move the latter; a sensor interposed between said accumulating conveyer and said egg director, and producing a signal to switch on said electric motor after an egg drops from said director; a device to stack the egg-filled trays, which is disposed at the other end of said tray delivering conveyer; a means to accumulate the egg-filled trays into a stack, which is incorporated in said stacking device; a mechanism for a single-piece feed of filled trays to said means with a simultaneous turn of the tray in the horizontal plane through 90° relative to the preceding tray, which mechanism is incorporated in said stacking device, said mechanism for a single-piece feed of filled trays to said means being drivingly connected with said mechanism for single-piece separation of empty trays from the stack, with the tray delivering conveyer, and with the egg accumulating conveyer, for their coordinated movement with the latter.

2. An installation as claimed in claim 1, wherein the means to accumulate a stack of egg-filled trays comprises a horizontal frame, a sensor mounted above the frame at a distance equaling the stack height, an electric magnet which is electrically connected with the sensor, and throw-over catches mounted on axles which are hingedly secured in one horizontal plane on the opposite sides of the frame, are rigidly connected through a linkage with the core of the electric magnet, and are fitted with detents to interact with the catches for their positive swinging as the accumulated stack engages the sensor producing a signal to energize the electric magnet.

3. An installation as claimed in claim 1, wherein the mechanism for a single-piece feed of the egg-filled trays to the stack accumulating means with a simultaneous turn of the tray in the horizontal plane through 90° relative to the preceding tray comprises a crank gear, a lifting platform rigidly mounted on a push rod of the crank gear, and a cylinder through which passes the push rod, and in the side wall of which there is made a channel of an approximately V-shaped configuration and a swivel rocker connected with a swivel valve are hingedly secured thereto, the free ends of the branches of this channel and their junction passing into vertical channel sections, while the valve is hinged between the channel branches and alternately shuts them after the rocker is swivelled by a pin secured on said push rod and sliding along one of the channel branches as the platform rises.

4. An installation as claimed in claim 1, wherein the driving connection of the mechanism for a single-piece feed of egg-filled trays and their simultaneous turn in the horizontal plane through 90° with the tray delivering conveyer, the egg accumulating conveyer, and the mechanism for single-piece separation of empty trays from the stack is realized by means of chain transmissions, a bevel gear pair, and a distribution shaft carrying sprockets to engage said chain transmissions, one of said bevel gears being rigidly mounted on the drive shaft of the egg accumulating conveyer, and the other one being fixed on the distribution shaft and through said chain transmissions connected with the drive shaft of the tray delivering conveyer and with the mechanism for single-piece separation of empty trays from the stack.

5. An installation as claimed in claim 4, wherein the mechanism for single-piece separation of empty trays from the stack comprises two rotary cylinders mounted on either side of the stack, a screw threading being formed on the side surface of each of said cylinders to enable them catching the edge of the lowermost tray and moving it down, and rotation of the cylinders being realized through bevel gearings whose driven gears are rigidly connected to the cylinders, while their pinions are rigidly secured on a shaft rotated by one of the chain transmissions connecting the distribution shaft with the mechanism for single-piece separation of empty trays from the stack.

6. An installation as claimed in claim 5, wherein with the cylinders rotating onward each other, the screw threading on one of the cylinders is made right-handed, and on the other one, left-handed.

7. An installation as claimed in claim 4, wherein the tray delivering conveyer is made of parallel vee belts.

8. An installation as claimed in claim 4, wherein the cells of the egg accumulating conveyer have a shape and size coinciding with those of the tray cells.

9. An installation as claimed in claim 8, wherein mounted in one line with the egg director and the egg accumulating conveyer is a trough to collect eggs whose size exceeds that of the cell of the accumulating conveyer.

10. An installation as claimed in claim 1, wherein mounted after the device to stack egg-filled trays and in line with the tray delivering conveyer is a conveyer for accumulating stacks of filled trays, the drive shaft thereof being connected with the drive shaft of the tray delivering conveyer.

* * * * *